No. 711,466. Patented Oct. 21, 1902.
A. E. BRONSON, Jr.
COOKING UTENSIL.
(Application filed May 10, 1902.)
(No Model.)
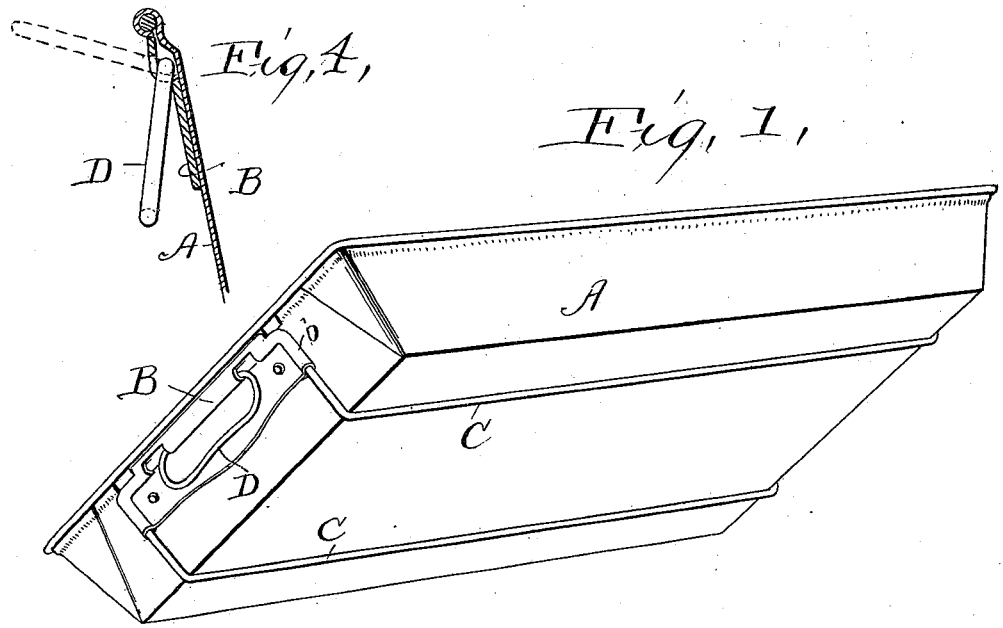
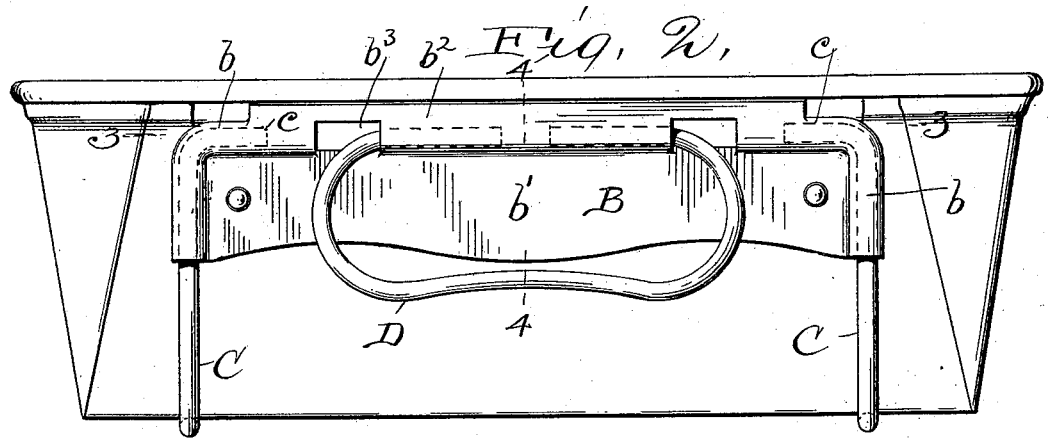
Witnesses
E. B. Gilchrist
H. W. Wise
Inventor
Adelbert E. Bronson Jr
By his attorney
Thurston & Bates

UNITED STATES PATENT OFFICE.

ADELBERT E. BRONSON, JR., OF CLEVELAND, OHIO, ASSIGNOR TO THE BRONSON-WALTON COMPANY, OF CLEVELAND, OHIO, A CORPORATION OF OHIO.

COOKING UTENSIL.

SPECIFICATION forming part of Letters Patent No. 711,466, dated October 21, 1902.

Application filed May 10, 1902. Serial No. 106,682. (No model.)

*To all whom it may concern:*

Be it known that I, ADELBERT E. BRONSON, Jr., a citizen of the United States, residing at Cleveland, in the county of Cuyahoga and State of Ohio, have invented a certain new and useful Improvement in Cooking Utensils, of which the following is a full, clear, and exact description, reference being had to the accompanying drawings.

The invention relates to an improvement in cooking-pans, the object being to provide a convenient cooking-pan having means for holding the bottom of the pan from direct contact with the top of the stove or oven bottom and with loops or handles by which the pan may be lifted.

The invention consists in the construction and combination of parts hereinafter described, and definitely pointed out in the claims.

In the drawings, Figure 1 is a perspective view of a pan embodying the invention. Fig. 2 is an end view of said pan. Fig. 3 is a sectional plan view in the plane indicated by line 3 3 of Fig. 2. Fig. 4 is a vertical sectional view in the plane indicated by the line 4 4 of Fig. 2.

The pan A is of any convenient shape and size and is of familiar construction. Riveted to each end of the pan is a retaining-plate B, which is fashioned so as to have the functions of attaching to the pan the two wires C C and the lifting loops or handles D D. The wires C C pass under the pan from end to end and are turned up against the ends of the pan. The extreme ends $c\ c$ of these wires are bent toward each other into substantially horizontal positions. Each of the plates B is bent at its end and at its top edge near its ends out of the plane in which the major part of the plate lies, as indicated at $b\ b$ in the drawings, thereby forming between the plates and pan ends recesses which receive the upper ends of the wire C, including their bent-over extremities $c$. When the plates are riveted to the pan, they hold the ends of the wires in the position shown. The ends of said plates outside of said recesses are bent back and around the vertical parts of the wires C, lying between said wires and the outer surface of the pan, wherefore the plate clamps the wires against the pan and the wire also clamps the vertical edges of the plate between itself and the pan. The middle part $b'$ of the plate near its upper edge is also bent outward to form between itself and the pan a recess or socket place $b^2$ for the ends of the wire lifting loops or handles D. Holes $b^3$ are cut through the plate B at both ends of these recesses or socket places $b^2$ to permit the insertion of the ends of the lifting-loops. The upper walls of these holes $b^3$ serve as stops limiting the upward-swinging movement of the lifting-loops, which loops engage with the shoulders when they have been swung up to the position substantially as indicated by dotted lines in Fig. 4.

The construction described is a cheap construction for neatly securing a cooking-pan having the desirable characteristics of construction herein first referred to.

Having described my invention, I claim—

1. A cooking-pan combined with wires extending under its bottom and up against its end and having their ends bent, a separate wire lifting-loop, and a retaining-plate secured to the end of the pan and having outwardly-bent recesses to receive the ends of the wires and an outwardly-bent socket to loosely receive the ends of the lifting-loop, there being holes opposite the socket which said loop occupies, substantially as described.

2. A cooking-pan combined with wires extending under its bottom and up against its end and having their ends bent into substantially horizontal position, a separate wire lifting-loop, and a retaining-plate secured to the end of the pan and bent outward to receive the ends of the wires and to receive the loop, said bends in the plate being in alinement and being separated by openings which the loop occupies, the upper wall of said openings forming stops when the loop is swung up into substantially horizontal position, substantially as described.

In testimony whereof I hereunto affix my signature in the presence of two witnesses.

ADELBERT E. BRONSON, JR.

Witnesses:
E. L. THURSTON,
E. B. GILCHRIST.